(12) United States Patent
Herrada et al.

(10) Patent No.: US 12,202,443 B2
(45) Date of Patent: Jan. 21, 2025

(54) BRUSHLESS DIRECT-CURRENT ELECTRIC MOTOR FOR A MOTOR VEHICLE WIPER SYSTEM

(71) Applicant: Valeo Systemes d'Essuyage, La Verriere (FR)

(72) Inventors: Jose-Luis Herrada, La Verriere (FR); Alain Servin, La Verriere (FR); Mehdi Belhaj, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 225 days.

(21) Appl. No.: 17/627,411

(22) PCT Filed: Jun. 29, 2020

(86) PCT No.: PCT/EP2020/068312
§ 371 (c)(1),
(2) Date: Jan. 14, 2022

(87) PCT Pub. No.: WO2021/018496
PCT Pub. Date: Feb. 4, 2021

(65) Prior Publication Data
US 2022/0348166 A1 Nov. 3, 2022

(30) Foreign Application Priority Data

Jul. 31, 2019 (FR) ..................... 1908797

(51) Int. Cl.
*H02K 11/21* (2016.01)
*B60S 1/08* (2006.01)
(Continued)

(52) U.S. Cl.
CPC ............... *B60S 1/08* (2013.01); *H02K 7/083* (2013.01); *H02K 7/1166* (2013.01);
(Continued)

(58) Field of Classification Search
CPC ......... B60S 1/08; H02K 11/215; H02K 7/083; H02K 7/1166; H02K 21/16; H02K 2211/03
(Continued)

(56) References Cited

U.S. PATENT DOCUMENTS

| 9,077,231 B2 | 7/2015 | Ozaki et al. |
| 10,797,561 B2 | 10/2020 | Shoda et al. |
| 2002/0079758 A1* | 6/2002 | Matsuyama ........... H02K 5/225 310/91 |

FOREIGN PATENT DOCUMENTS

| CN | 103378692 A | 10/2013 |
| CN | 103978954 A | 8/2014 |

(Continued)

OTHER PUBLICATIONS

European Patent Office, International Search Report (with English translation) and Written Opinion of corresponding International Application No. PCT/EP2020/068312, dated Sep. 29, 2020.

(Continued)

*Primary Examiner* — Terrance L Kenerly
(74) *Attorney, Agent, or Firm* — Valeo Systemes d'Essuyage

(57) ABSTRACT

The invention relates to a geared motor comprising a first brushless electric motor part having a stator, a rotor and a drive shaft, a second part having an output shaft and a reduction gear mechanism and an electronic part. The reduction gear mechanism comprises an output shaft, a worm and a toothed wheel designed to be engaged by the worm and to drive the output shaft in rotation. The geared motor comprises at least one rolling guide bearing disposed on the drive shaft and a multipolar magnet for measuring the position of the rotor. The rolling bearing is disposed between the measurement magnet and the worm such that the electric (Continued)

motor can be controlled depending on the measurement of the position of the rotor.

10 Claims, 8 Drawing Sheets

(51) Int. Cl.
  *H02K 7/08* (2006.01)
  *H02K 7/116* (2006.01)
  *H02K 11/215* (2016.01)
  *H02K 21/16* (2006.01)
(52) U.S. Cl.
  CPC ........... *H02K 11/215* (2016.01); *H02K 21/16* (2013.01); *H02K 2211/03* (2013.01)
(58) Field of Classification Search
  USPC ................................................ 310/90, 68 B
  See application file for complete search history.

(56) References Cited

FOREIGN PATENT DOCUMENTS

| | | | |
|---|---|---|---|
| CN | 104104192 | A | 10/2014 |
| CN | 106663991 | A | 5/2017 |
| CN | 108141104 | A | 6/2018 |
| DE | 102015220900 | A1 | 3/2018 |
| EP | 3171491 | A1 | 4/2017 |
| EP | 3300232 | A1 | 5/2017 |
| FR | 3056355 | A1 | 3/2018 |
| WO | 9718119 | A1 | 5/1997 |
| WO | WO-2018219742 | A1 * | 12/2018 ................ B60S 1/08 |

OTHER PUBLICATIONS

China Patent Office, Chinese Office Action of corresponding Chinese Patent Application No. 202080052831.7, dated Mar. 27, 2024.

* cited by examiner

BRUSHLESS DIRECT-CURRENT ELECTRIC MOTOR FOR A MOTOR VEHICLE WIPER SYSTEM

CROSS-REFERENCE TO RELATED APPLICATIONS

This application is filed under 35 U.S.C. § 371 U.S. National Phase of International Application No. PCT/EP2020/068312 filed Jun. 29, 2020 (published as WO2021018496), which claims priority benefit to French application No. 1908797 filed on Jul. 31, 2019, the disclosures of which are herein incorporated by reference in their entirety.

TECHNICAL FIELD

The subject of the invention is an electric motor, preferably a brushless electric motor, for a wiper system of a motor vehicle.

BACKGROUND OF THE INVENTION

It is known that such an electric motor primarily has a rotor and a stator. Generally, the stator comprises a plurality of coils for electromagnetically exciting the rotor, while the rotor comprises a multipole magnet. The electric motor is configured such that, when the coils are supplied with electric current, a magnetic field is created, causing the multipole magnet to rotate, which rotates a driveshaft. The driveshaft bears an endless screw engaging with a gear wheel secured to an output shaft.

On account of the introduction of the electric motor into the wiper system of the electric vehicle, the electric motor needs to be as compact and lightweight as possible.

BRIEF SUMMARY OF THE INVENTION

The present disclosure seeks to improve the situation.

To this end, a brushless electric motor, in particular for a wiper device of a motor vehicle, is proposed, comprising a first part, known as the electric part, having a stator and a rotor, the stator comprising a plurality of electromagnetic excitation coils and the rotor being mounted so as to rotate a driveshaft about an axis of rotation, the motor also comprising a second part, known as the electronic part, having an output shaft and a reduction gear mechanism, the reduction gear mechanism comprising an endless screw of the driveshaft and a gear wheel designed to be engaged by the endless portion and to rotate the output shaft, the electric motor comprising at least one rolling bearing for guiding the rotation of the driveshaft, and a multipole magnet for measuring the position of the rotor, the rolling bearing being disposed on the driveshaft between said magnet for measuring the position of the rotor and the endless screw, such that said electric part has the magnet for measuring the position of the rotor.

Thus, by virtue of the position of the magnet for measuring the position of the rotor, the motor is compartmentalized between the electric part, for the one part, and the electronic part, for the other part, this simplifying assembly and ensuring better bending strength of the driveshaft.

According to another aspect, the motor comprises a circuit board provided with a first part, known as the main part, and with a second part, known as the transverse part, which protrudes from the main part toward the electric part, the transverse part bearing a magnetic sensor configured to cooperate with the multipole magnet.

According to another aspect, the transverse part is disposed next to the multipole magnet.

According to another aspect, the motor comprises a component, known as the intermediate component, having an annulus configured to be mounted around the driveshaft and comprising a connector.

According to another aspect, the connector is configured to transmit power signals bound for the stator and to transmit signals relating to the position of the rotor.

According to another aspect, the motor comprises an auxiliary circuit board intended to determine the position of the rotor.

According to another aspect, the auxiliary circuit board is disposed in an orientation parallel or perpendicular to said main part.

According to another aspect, the circuit board is disposed next to the multipole magnet and is provided with a magnetic sensor configured to cooperate with the multipole magnet.

According to another aspect, the auxiliary circuit board is supported by at least the annulus and/or the connector of the intermediate component.

Also proposed is a wiper system for a motor vehicle, comprising an electric motor such as described above.

BRIEF DESCRIPTION OF THE DRAWINGS

Further features, details and advantages will become apparent on reading the following detailed description, and on studying the appended drawings, in which.

DETAILED DESCRIPTION OF THE INVENTION

Figure 1:
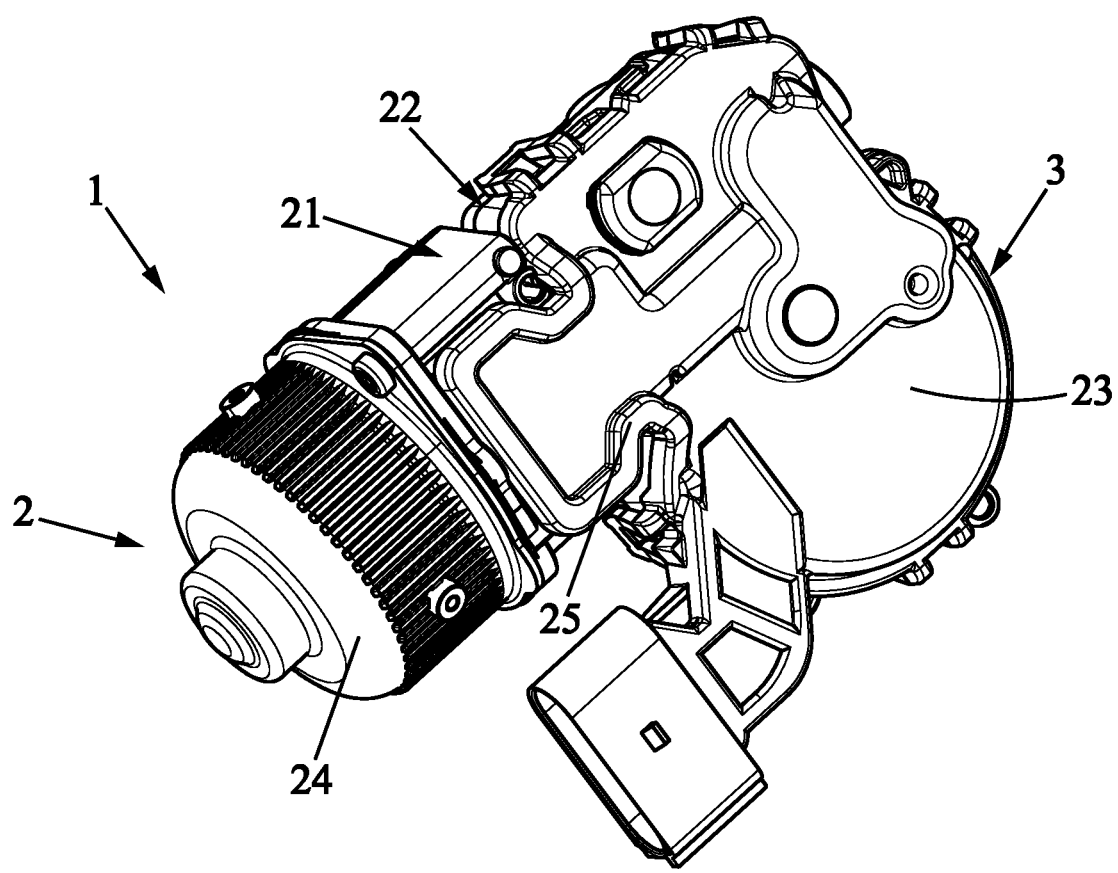
FIG. 1 illustrates a perspective view of an electric motor according to a first embodiment of the invention.

The drawings and the description below contain, for the most part, elements of a certain character. Therefore, they may not only serve for understanding the present disclosure better, but also contribute to its definition, where appropriate.

The subject of the invention is a brushless electric motor, preferably a brushless DC electric motor, for a wiper system of an automotive vehicle, referenced 1 in the figures.

The invention will now be described with reference to the first embodiment in FIGS. 1 to 4.

As can be seen in the figures, the motor 1 comprises an electric part 2 and an electronic part 3.

The electric part 2 has a rotor 4 and a stator 5. The stator 5 comprises a plurality of coils 6 for electromagnetically exciting the rotor 4. The rotor 4 comprises a multipole magnet mounted so as to be rotated about an axis of rotation, referenced L.

The electric motor 1 is configured such that the rotor 4 turns inside the stator 5, thereby rotating a shaft 8, known as a driveshaft, 8, that is secured to the rotor 4. The driveshaft 8 extends along the axis of rotation L.

The electronic part 3 comprises an endless screw 9 of the driveshaft 8 and a gear wheel 10 mounted so as to be engaged by the endless screw 9. The electronic part 3 also comprises an output shaft 11 designed to be rotated by the gear wheel 10.

Thus, the threaded part 9 and the gear wheel 10 form a reduction gear mechanism M, the speed of rotation of the output shaft 11 being lower than the speed of rotation of the driveshaft 8.

Advantageously, the output shaft 11 is substantially perpendicular to the driveshaft 8.

Figure 3:
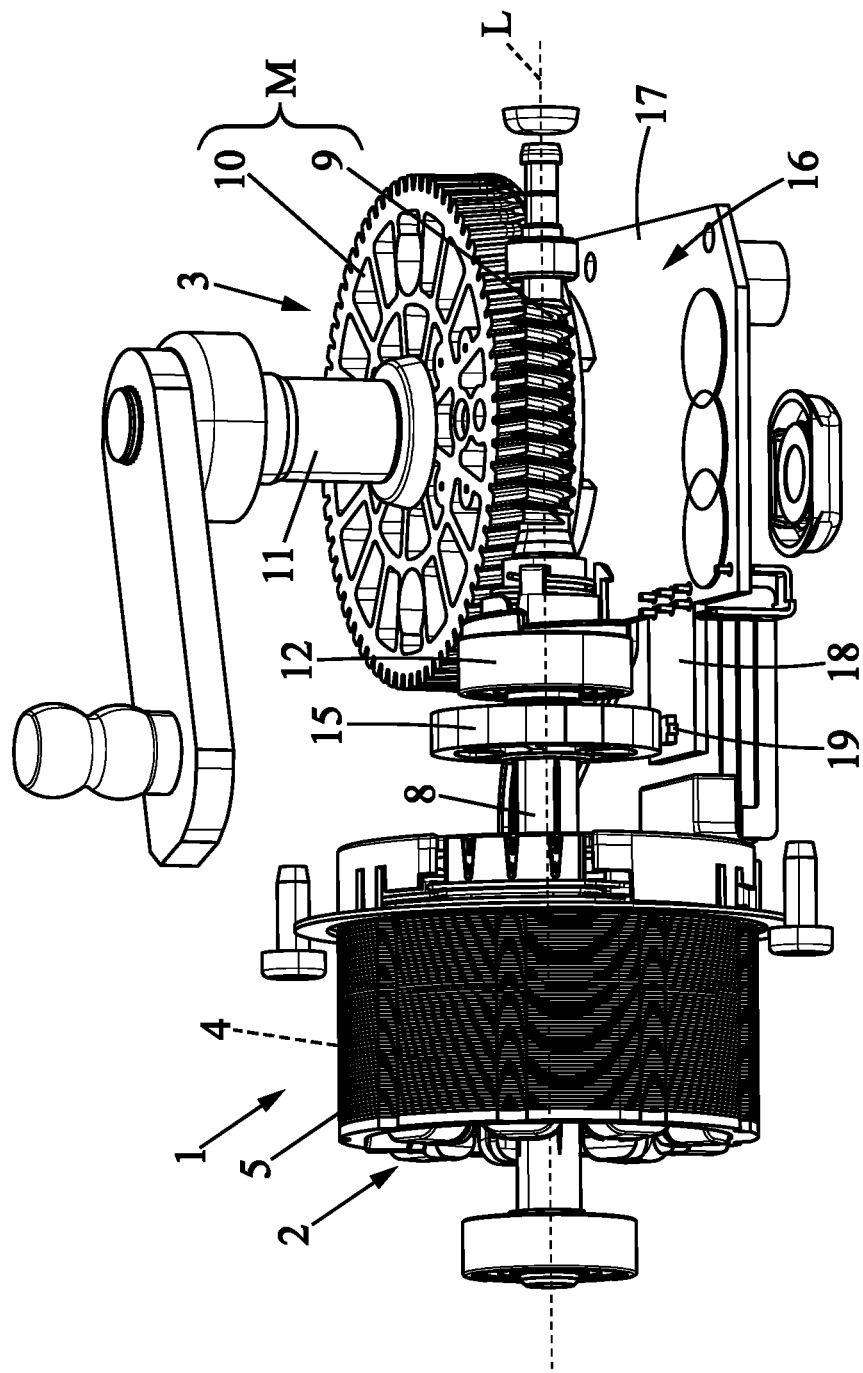
FIG. 3 illustrates a perspective side view of the motor in FIG. 1, without a casing.

As can be seen in FIG. 3, a rolling bearing 12 guides the driveshaft 8. As is known to a person skilled in the art, the rolling bearing comprises an inner ring and an outer ring that are separated by a cage provided with rolling elements, the inner and outer rings being decoupled from one another.

As can also be seen in FIG. 3, the electric motor 1 comprises a multipole magnet 15 disposed in the electric part 2, the rolling bearing 12 being mounted between the multipole magnet 15 and the endless screw 9.

Thus, since the magnet 15 is an integral part of the electric part 2, the electric motor 1 is compartmentalized between the electric part 2, for the one part, and the electronic part 3, for the other part. On account of this clean separation of the functions between the electric part 2 and electronic part 3, the electric motor 1 is made more reliable and more compact. The position of the rolling bearing 12 as close as possible to the wheel 10 allows better bending strength, meaning that the driveshaft 8 deforms or breaks under a higher bending load.

As can be seen in FIG. 3, the multipole magnet 15 is a flat cylinder mounted on the driveshaft 8.

Figure 2:
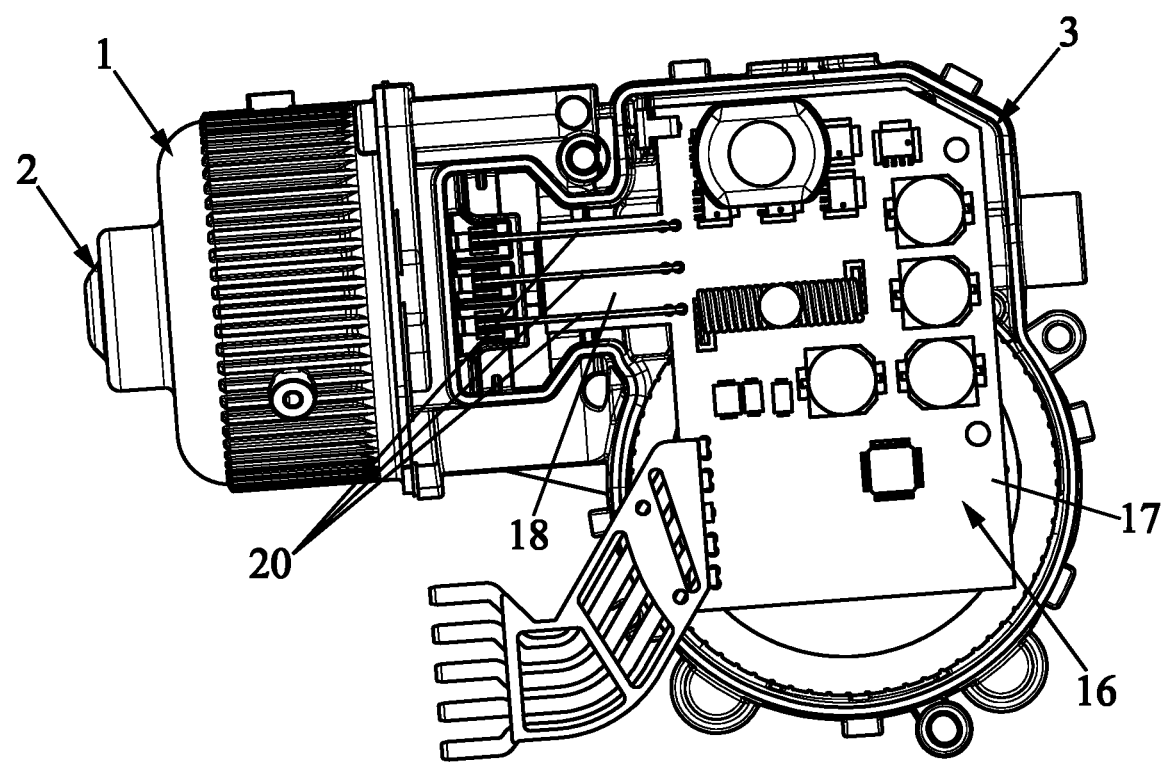
FIG. 2 illustrates a bottom view of the motor in FIG. 1, a cover not being illustrated.

The electric motor 1 also comprises a circuit board 16, illustrated in FIGS. 2 and 3, comprising a first part 17, known as the main part, and a second part 18, known as the transverse part, which protrudes from the main part 17 toward the electric part 2. The circuit board 16 comprises the circuits and electronic components necessary for supplying power to and switching the stators and controlling the motor.

The main part is disposed facing the endless screw 9 of the driveshaft 8.

The transverse part 18 is disposed facing the multipole magnet 15 and bears a magnetic sensor 19, for example a Hall effect sensor, for detecting the changes in poles of the multipole magnet 15, such that the assembly formed by the multipole magnet 15 and the magnetic sensor 19 constitutes a sensor for measuring the position of the rotor 4.

As can be seen more particularly in FIG. 2, each of the main part 17 and transverse part 18 has the overall shape of a parallelepiped, the transverse part 18 having a width less than a length of the main part 17. Thus, the transverse part 18 is a narrow protuberance, making it possible to install other elements of the motor 1 in the space between the main part 17 and the transverse part 18 and thus to increase the compactness of the electric motor 1.

The circuit board 16 also comprises pins 20 for supplying power to the coils 6.

As can be seen in FIG. 1, the electric motor 1 comprises a casing 21 having a cap 22 and a cover 23 that are secured together so as to form a housing for the mechanism M and the circuit board 16. The casing 21 also comprises a housing 24 for the rotor 4 and stator 5 assembly.

The cover 23 is designed to cover in particular the gear wheel 10 and the circuit board 16 and comprises a narrowing 25 allowed by the thin protrusion formed by the transverse part 18 relative to the part 17, thereby ensuring, as already indicated, better compactness of the motor 1.

The invention will now be described with reference to the second embodiment in FIGS. 4 to 7. The elements already described in relation to the first embodiment bear the same reference numerals.

As can be seen in the FIGS. 4 to 7, the motor 1 comprises an electric part 2 and an electronic part 3.

The electric part 2 has a rotor 4 and a stator 5. The stator 5 comprises a plurality of electromagnetic excitation coils 6. The rotor 4 comprises a multipole magnet mounted so as to be rotated about an axis of rotation, referenced L.

The electric motor 1 is configured such that the rotor 4 turns inside the stator 5, thereby rotating a shaft 8, known as a driveshaft, 8, that is secured to the rotor 4. The driveshaft 8 extends along the axis of rotation L.

The electronic part 3 comprises an endless screw 9 of the driveshaft 8 and a gear wheel 10 mounted so as to be engaged by the endless screw 9. The electronic part 3 also comprises an output shaft 11 designed to be rotated by the gear wheel 10.

Thus, the threaded part 9 and the gear wheel 10 form a reduction gear mechanism M, the speed of rotation of the output shaft 11 being lower than the speed of rotation of the driveshaft 8.

Advantageously, the output shaft 11 is substantially perpendicular to the driveshaft 8.

Figure 5:
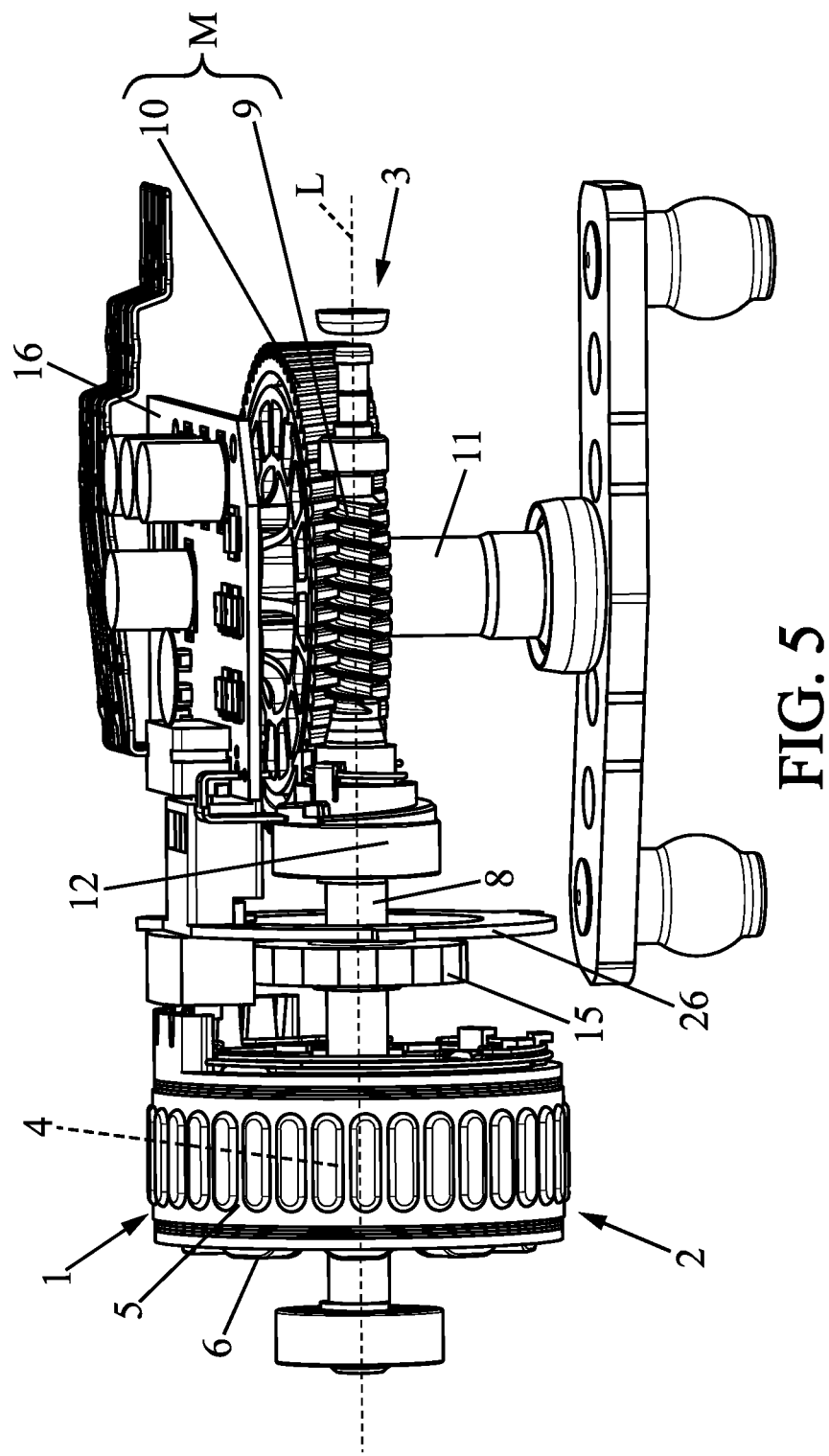
FIG. 5 illustrates a perspective side view of the motor in FIG. 4, without a casing.

As can be seen in FIG. 5, a rolling bearing 12 guides the driveshaft 8. As is known to a person skilled in the art, the rolling bearing comprises an inner ring and an outer ring that are separated by a cage provided with rolling elements, the inner and outer rings being decoupled from one another.

As can also be seen in FIG. 5, the electric motor 1 comprises a multipole magnet 15 disposed in the electric part 2, the rolling bearing 12 being mounted between the multipole magnet 15 and the endless screw 9.

Thus, since the magnet 15 is an integral part of the electric part 2, the electric motor 2 is compartmentalized between the electric part 2, for the one part, and the electronic part 3, for the other part. On account of this clean separation of the functions between the electric part 2 and electronic part 3, the electric motor 1 is made more reliable and more compact. The position of the rolling bearing 12 as close as possible to the wheel 10 allows better bending strength, meaning that the driveshaft 8 deforms or breaks under a higher bending load.

As can be seen in FIG. 5, the multipole magnet 15 is an annulus mounted on the driveshaft 8.

The electric motor 1 also comprises a circuit board 16 bearing pins 20 for supplying power to the coils 6. The circuit board 16 has the overall shape of a parallelepiped.

The electric motor 1 also comprises an intermediate component 26 disposed between the multipole magnet 15 and the guiding rolling bearing 12.

Figure 7:
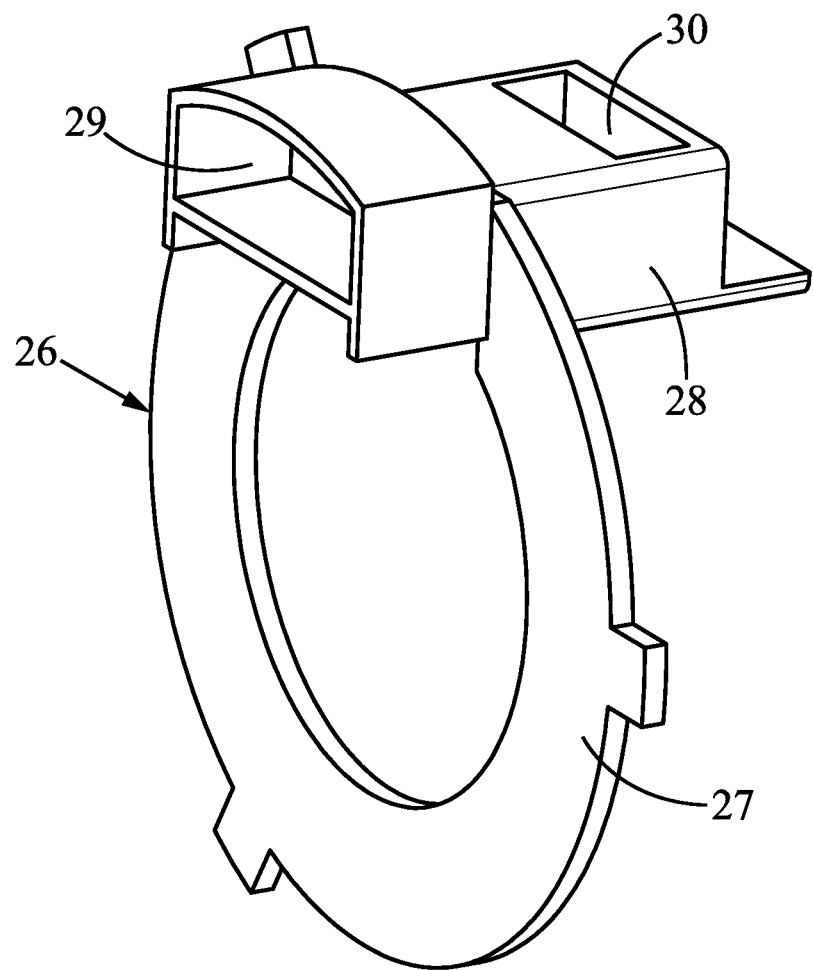
FIG. 7 illustrates a perspective side of an intermediate component of the electric motor in FIG. 4.

As can be seen more particularly in FIG. 7, the intermediate component 26 comprises an annulus 27 designed to be mounted around the drive shaft 8 and to be surmounted by an electric connector 28 secured to the annulus 27.

The annulus 27 ensures the mechanical alignment of the arrangement. The electric connector 28 ensures the transmission of power signals (that is to say the currents for supplying electric power to the coils) and the transmission of signals relating to the position of the rotor, as will now be explained.

Thus, the intermediate component 26 allows the combination of three functions, namely the mechanical alignment, power transmission (electric power supply of the coils of the stator) and the transmission of the command (position of the rotor).

The connector 28 comprises a housing part 29 extending from the annulus 27 toward the magnet 15 and a housing part 30 extending from the annulus 27 toward the circuit board 16, the slots 20 for the power supply of the coils passing through the housings 29 and 30.

Figure 6:
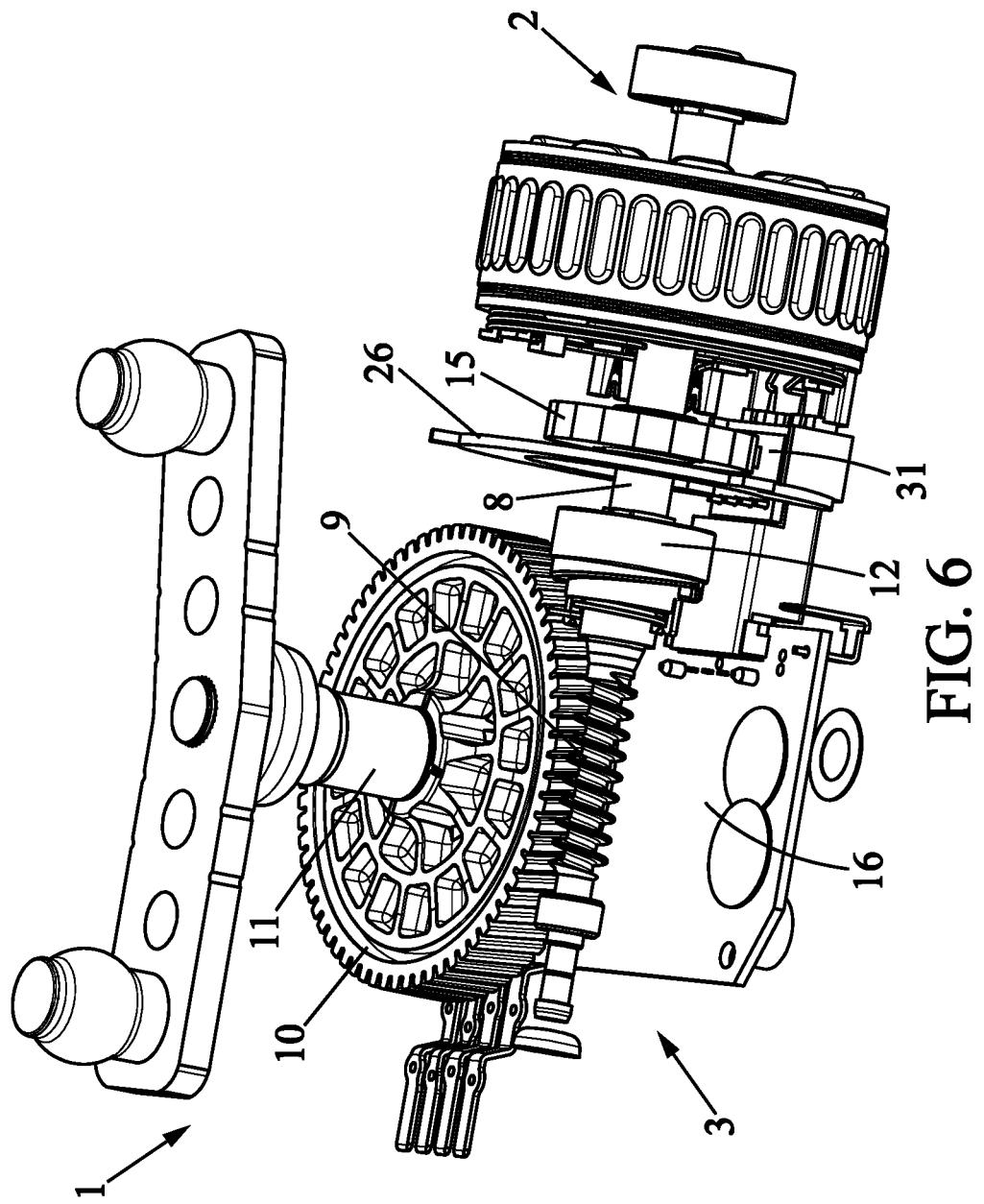
FIG. 6 illustrates another perspective side view of the motor in FIG. 4, without a casing.

As can be seen in FIG. 6, the connector 28 also comprises an auxiliary circuit board 31 disposed facing the multipole magnet 15. The circuit board 31 bears a magnetic sensor 19, for example a Hall effect sensor, for detecting the changes in poles of the multipole magnet 15, such that the assembly formed by the multipole magnet 15 and the magnetic sensor 19 constitutes a sensor for the angular position of the rotor 4. Thus, the signals output by the sensor 19 can be transmitted by the connector 28. The auxiliary circuit board 31 is advantageously intended only for the sensor 19, thereby ensuring that it takes up little space.

In this embodiment, the auxiliary circuit board is disposed in an orientation parallel to the circuit board 16. However, other orientations could be possible in other configurations: for example, the auxiliary circuit board 31 could be disposed in an orientation perpendicular to the circuit board 16. The auxiliary circuit board 31 is preferably carried by the annulus 27 or the connector 28, but could also be mounted freely in the casing in another orientation and connected electrically to the circuit board by, for example, flexible conductors.

Figure 4:
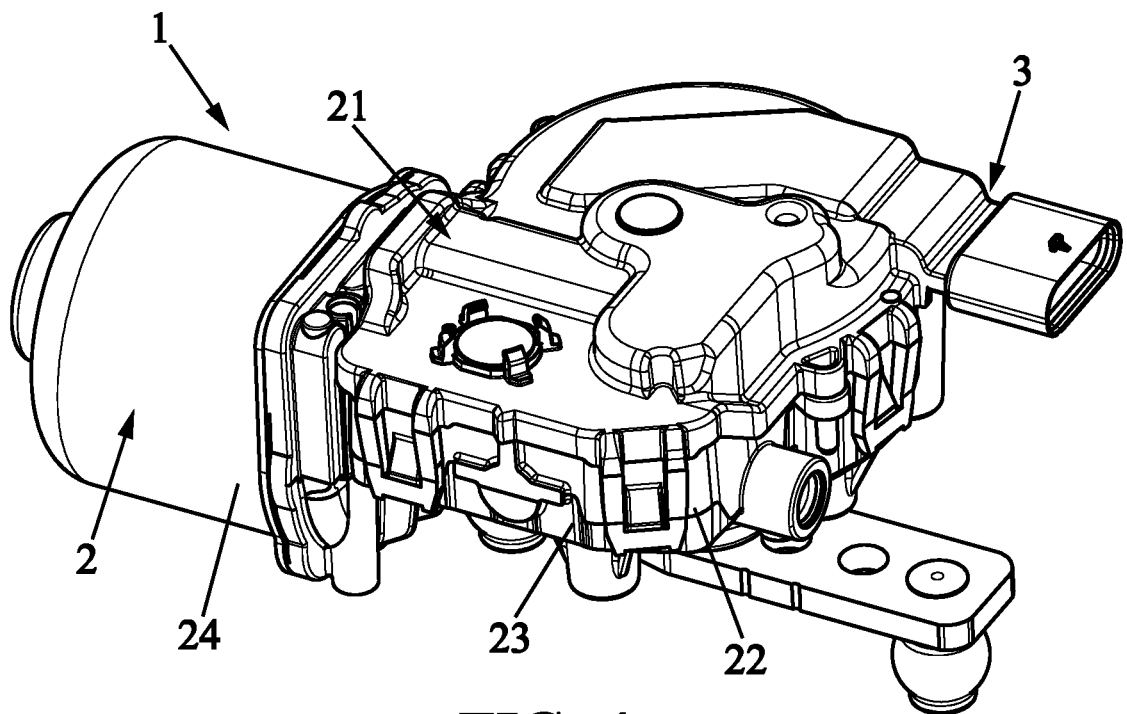
FIG. 4 illustrates a perspective view of an electric motor according to a second embodiment of the invention.

As can be seen in FIG. 4, the electric motor 1 comprises a casing 21 having a cap 22 and a cover 23 that are secured together so as to form a housing for the mechanism M and the circuit board 16. The casing 21 also comprises a housing 24 for the rotor 4 and stator 5 assembly.

Figure 8:
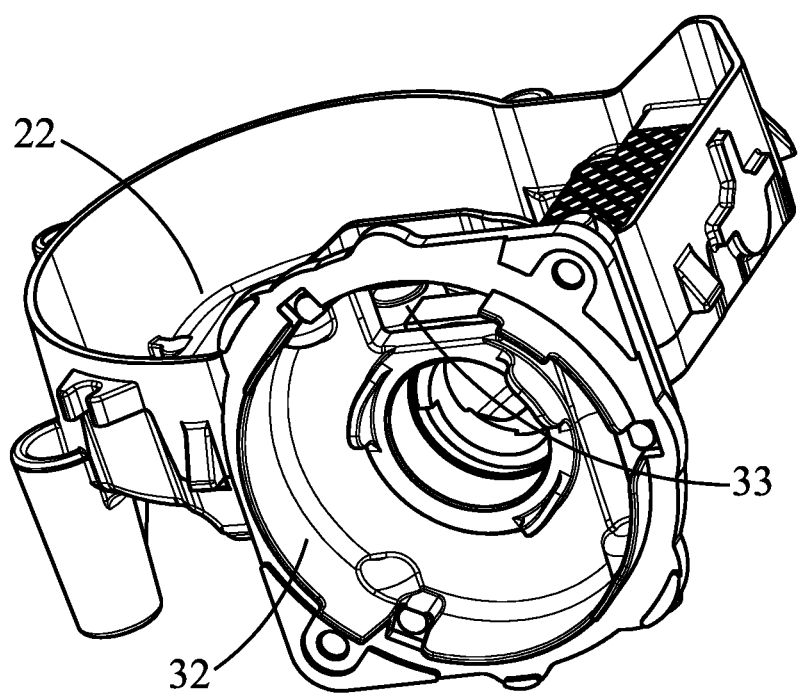
FIG. 8 illustrates a perspective view of a casing part of the electric motor in FIG. 4.

As can be seen in FIG. 8, the cap 22 comprises a housing 32 for receiving the annulus 27 and an orifice 33 for housing the connector 28.

It will be noted that the intermediate component 26 makes it possible to keep a casing that is unchanged with respect to the prior art, thereby avoiding the need to modify known electric motor production lines.

REFERENCE SIGNS

10 Wiper motor
12 Electric motor
14 Housing
16 Gearbox housing
18 Housing element
20 Housing element
22 Gearbox cover
24 Gearwheel
25 Axis of rotation
26 Output shaft
27 Toothing
28 Output shaft
30 Element
32 Track
34 Contact portion
35 Spring element
36 End portion
37 Line
38 Cover bottom
39 Stamped/bent part
40 Receptacle
42 Protective wall
43 Protective wall
44 Protective wall
46 Inner face
47 Inner face
48 End side
51 Slot
52 Slot
54 Blocking element
56 Introduction direction
58 Protrusion
59 Portion
60 Portion
62 Gap
A Distance
$A_1$ Distance
$A_2$ Distance
$A_3$ Distance
X Position
Y Position
Z Position
F Contact force

What is claimed is:

1. A brushless electric motor for a wiper device of a motor vehicle, comprising
an electric part known as a first part having a stator and a rotor, where the stator includes a plurality of coils for electromagnetically exciting the rotor and the rotor configured to rotate a driveshaft about an axis of rotation (L);
the motor also includes an electronic part known as a second part having an output shaft and a reduction gear mechanism (M);
the reduction gear mechanism (M) including an endless screw on the driveshaft and a gear wheel designed to be engaged by the endless screw and to rotate the output shaft;
a multipole magnet for measuring the position of the rotor through a magnetic sensor, where a rolling bearing is disposed on the driveshaft between said magnet for measuring a position of the rotor and the endless screw, such that the electric part has said magnet for measuring the position of the rotor;
an intermediate component having an annulus configured to be mounted around the driveshaft, the intermediate component surmounted by an electric connector secured to the annulus; and
where the intermediate component is disposed between the multipole magnet and the guiding rolling bearing.

2. The brushless electric motor of claim 1, including a circuit board provided with a main part and a transverse part, which protrudes from the main part toward the electric part, where the transverse part bears the magnetic sensor configured to cooperate with the multipole magnet.

3. The brushless electric motor of claim 2, wherein the transverse part is disposed directly adjacent the multipole magnet.

4. The brushless electric motor of claim 1, where the electric connector is configured to cooperate with a circuit board.

5. The brushless electric motor of claim 4, wherein the electric connector is configured to transmit power signals bound for the stator and to transmit signals relating to the position of the rotor.

6. The brushless electric motor of claim 4, comprising an auxiliary circuit board intended to determine the position of the rotor.

7. The brushless electric motor of claim 1, wherein an auxiliary circuit board is disposed in an orientation parallel to or perpendicular to said circuit board.

8. The brushless electric motor of claim 7, wherein the auxiliary circuit board is disposed next to the multipole magnet and is provided with a magnetic sensor configured to cooperate with the multipole magnet.

9. The brushless electric motor of claim 1, wherein the auxiliary circuit board is supported by at least the annulus or the electric connector of the intermediate component.

10. A wiper system for a motor vehicle, comprising:
- a brushless electric motor where an electric part known as a first part includes a stator and a rotor;
- where the stator includes a plurality of coils for electromagnetically exciting the rotor and the rotor configured to rotate a driveshaft about an axis of rotation (L);
- the motor also includes an electronic part known as a second part having an output shaft and a reduction gear mechanism (M);
- the reduction gear mechanism (M) including an endless screw on the driveshaft and a gear wheel designed to be engaged by the endless screw and to rotate the output shaft;
- a multipole magnet whose position of the rotor is measured by a magnetic sensor placed in contact with a transverse part that is a circuit board;
- where a rolling bearing is disposed on the driveshaft between said magnet for measuring a position of the rotor and the endless screw and such that the electric part has said magnet for measuring the position of the rotor;
- an intermediate component having an annulus configured to be mounted around the driveshaft, the intermediate component surmounted by an electric connector secured to the annulus; and
- where the intermediate component is disposed between the multipole magnet and the guiding rolling bearing.

* * * * *